United States Patent [19]

Walters

[11] Patent Number: 4,732,816

[45] Date of Patent: Mar. 22, 1988

[54] COVER SYSTEM FOR CONCRETE

[75] Inventor: D. Gerald Walters, Dover, Del.

[73] Assignee: Reichhold Chemicals, Inc., White Plains, N.Y.

[21] Appl. No.: 857,925

[22] Filed: Apr. 30, 1986

[51] Int. Cl.$^4$ .................. B32B 27/30; B05D 3/02
[52] U.S. Cl. .................... 428/522; 427/136; 427/140; 427/393.6; 428/523
[58] Field of Search ............ 427/393.6, 136, 407.1, 427/140, 403, 292

[56] References Cited

U.S. PATENT DOCUMENTS

| | | | |
|---|---|---|---|
| 1,130,717 | 3/1915 | Ellis | 427/292 |
| 2,275,272 | 3/1942 | Scripture, Jr. | 427/136 X |
| 2,794,752 | 6/1957 | Schmidt | 427/393.6 |
| 4,141,737 | 2/1979 | Moon et al. | 427/136 X |
| 4,363,836 | 12/1982 | Sakato et al. | 427/393.6 X |
| 4,503,097 | 3/1985 | Higaki et al. | 427/393.6 X |

FOREIGN PATENT DOCUMENTS 58-161984  9/1983  Japan .................. 427/393.6

*Primary Examiner*—Thurman K. Page
*Attorney, Agent, or Firm*—Rodman & Rodman

[57] ABSTRACT

A method for coating a concrete substrate with a layer of ethylene-vinyl acetate copolymer latex, which forms a protective skin on the surface of the substrate.

17 Claims, No Drawings

COVER SYSTEM FOR CONCRETE

BACKGROUND OF THE INVENTION

1. FIELD OF THE INVENTION

The present invention relates to a cover system for concrete which is intended to retard water evaporation and avoid the formation of surface cracks.

2. DESCRIPTION OF THE PRIOR ART

Latex modified portland cement concrete, because of the latex it contains, tends to form a skin before the portland cement has fully set. Due to the evaporation of water from the portland cement, the skin or surface becomes subject to shrinkage forces that can result in surface cracks.

A standard practice in the art to avoid the formation of surface cracks is to apply wet burlap and plastic sheeting on the surface of the latex modified portland cement concrete as soon as the concrete has sufficient strength to withstand the application and weight of these covers. Naturally, the timing of applying these protective covers is very critical. If the covers are applied too early, that is, before the concrete has sufficient strength, the concrete surface will be deformed. If the protective covers are applied late, some surface cracks may have already formed. In addition, depending upon atmospheric conditions, the timing of applying the covers can be very brief, and can also delay the application of the concrete.

A further disadvantage in the use of a burlap/plastic covering system is that it is labor intensive, and requires at least two persons to apply these covers, which must then be removed after the concrete has reached a cured, set state.

SUMMARY OF THE INVENTION

The present invention relates to a method for coating a concrete substrate with a layer of ethylene-vinyl acetate copolymer latex, which forms a protective skin on the surface of the substrate which retards water evaporation and prevents the formation of surface cracks.

DESCRIPTION OF THE PREFERRED EMBODIMENTS

In accordance with the present invention, an uncured, unset concrete substrate is coated with a thin layer of ethylene-vinyl acetate copolymer latex to retard the evaporation of water from the concrete and prevent the formation of cracks on its surface.

It has also been discovered that when a dye is added to the ethylene copolymer latex, it can provide a visual indication of the extent and concentration of the ethylene-vinyl acetate latex coating, which is helpful where extensive areas of concrete are being treated with the ethylene-vinyl acetate latex coating.

In general, the concrete substrate which is coated with the ethylene-vinyl acetate copolymer latex is a latex modified portland cement. However, the inventive method is also amenable to coating other types of cement and concrete.

The layer of ethylene-vinyl acetate is contacted to the surface of the concrete substrate while the concrete is in an uncured, unset state, and after the concrete has been given its final finish. For some applications, as in the preparation of highway surfaces, the concrete will be tyned with lateral grooves for improved traction. In other instances, the road pavement will be given a textured surface, also known as a "broom surface." In still other applications, the concrete will be finished to a very smooth surface.

In each of the above-mentioned finishing treatments given to the concrete, the ethylene-vinyl acetate can be contacted to the surface of the finally finished concrete immediately after the concrete has been given its final finish. This is a distinct advantage over the prior art practice of applying wet burlap and plastic sheeting which requires the concrete to have sufficient strength to withstand the application and weight of these covers. In contrast, the application of the ethylene-vinyl acetate coating can be accomplished immediately after the concrete has been given its final finish. The ethylene-vinyl acetate coating is conveniently applied to the surface of the concrete substrate in the form of finely divided particles, preferably by application through a spray system that gives out a fine spray and allows for even application of the ethylene-vinyl acetate.

The amount of ethylene-vinyl acetate applied as a coating on the concrete substrate should be sufficient to prevent water evaporation from the concrete so that the formation of surface cracks is retarded. In general, the amount of ethylene-vinyl acetate per square foot of concrete surface or substrate will vary, depending upon atmospheric conditions, humidity, and temperature. Most often, the amount of ethylene-vinyl acetate will vary from about one gallon for each 15 to 25 square yards of concrete surface.

The ethylene-vinyl acetate copolymer latex most suitable in the present invention is prepared from an ethylene-vinyl acetate copolymer latex having about 17.65 parts of ethylene to 70.03 parts of vinyl acetate, and a 55% total solid content, available under the brand name ELVACE ® 40-707 (Reichhold Chemicals, Inc.). To 100 parts of the ELVACE ® 40-707, 10 parts of dibutyl phthalate is added. The dibutyl phthalate functions as a plasticizer The dibutyl phthalate modified ELVACE ® 40-707 is then diluted with about 65 parts of water, thereby reducing the overall solids content to about 34–36%. The pH varies from about 4–6, and the weight in pounds per gallon varies from about 8.5–8.7.

What is claimed is:

1. A method for retarding the formation of surface cracks on an uncured latex-modified portland cement concrete substrate, comprising:
    (a) contacting the surface of said uncured substrate with a layer of ethylene-vinyl acetate copolymer latex in amounts sufficient to retard the formation of surface cracks on the concrete substrate and prevent water evaporation from the concrete substrate, and
    (b) curing the concrete substrate at atmospheric conditions.

2. An article of manufacture comprising a latex-modified portland cement concrete substrate having a surface coating of an ethylene-vinyl acetate copolymer latex.

3. The method of claim 1, wherein the layer of ethylene-vinyl acetate is contacted to the surface of the concrete substrate after said concrete substrate has been given its final finish.

4. The method of claim 1, wherein the amount of ethylene-vinyl acetate contacted onto the surface of said concrete substrate varies from about one gallon of ethylene-vinyl acetate to about 15–25 square yards of concrete.

5. The method of claim 1, wherein the ethylene-vinyl acetate is contacted onto said concrete substrate in the form of finely divided particles.

6. The method of claim 5, wherein the finely divided ethylene-vinyl acetate particles are in the form of a spray.

7. The method of claim 6, wherein the dye is sensitive to ultraviolet light.

8. The method of claim 6, wherein the dye is a food coloring.

9. The method of claim 1, wherein the concrete substrate is road pavement.

10. The method of claim 9, wherein the surface of the road pavement is textured.

11. The method of claim 9, wherein the surface of the road pavement is tyned.

12. The method of claim 9, wherein the surface of the road pavement is smooth.

13. The article of manufacture of claim 2, wherein the concrete substrate is a road surface.

14. A cover system for retarding the formation of surface cracks on an uncured latex-modified concrete substrate consisting essentially of a layer of ethylene-vinyl acetate copolymer latex coated on a substrate of a latex modified portland cement concrete.

15. The cover system of claim 14, wherein the ethylene-vinyl acetate contains a dye.

16. The cover system of claim 14, wherein the concrete substrate is road pavement.

17. The method of claim 1, wherein the ethylene-vinyl acetate contains a dye to provide a visual indication of the extent and concentration of the ethylene-vinyl acetate coating.

* * * * *

UNITED STATES PATENT AND TRADEMARK OFFICE
CERTIFICATE OF CORRECTION

PATENT NO. : 4,732,816

DATED : March 22, 1988

INVENTOR(S) : D. Gerald Walters

It is certified that error appears in the above-identified patent and that said Letters Patent is hereby corrected as shown below: Title page:

In the title sheet change "Inventor: D. Gerald Walters, Dover, Del." to --Inventors: D. Gerald Walters, Dover, Del.; Charles P. Callaway, Dover, Del.--

At Column 3, the dependency of claims 7 and 8 is changed to depend from claim 17.

Signed and Sealed this

Twenty-ninth Day of November, 1988

Attest:

DONALD J. QUIGG

Attesting Officer      Commissioner of Patents and Trademarks